United States Patent [19]

Chupick

[11] 4,061,386
[45] Dec. 6, 1977

[54] ENERGY MANAGING BUMPER SYSTEM FOR VEHICLES

[75] Inventor: Ronald Chupick, Warren, Mich.

[73] Assignee: General Motors Corporation, Detroit, Mich.

[21] Appl. No.: 632,187

[22] Filed: Nov. 17, 1975

[51] Int. Cl.² ............................................ B60R 19/02
[52] U.S. Cl. ...................................... 293/86; 293/84; 293/89
[58] Field of Search .................................. 293/84–86, 293/73, 89, 96, DIG. 2, DIG. 3, 74, DIG. 5; 213/221, 223; 267/139–140, 116

[56] References Cited

U.S. PATENT DOCUMENTS 1,448,504   3/1923   Plante ..................................... 293/84

Primary Examiner—Allen N. Knowles
Attorney, Agent, or Firm—Charles R. White

[57] ABSTRACT

An elongated bumper beam extending laterally across the end of a vehicle is supported outwardly of the vehicle body by a pair of yieldable energy managing units straddling the vehicle center line and secured to the side rails of the frame. The system incorporates special restraining connectors to provide bumper beam pivot points outboard of the energy absorbing units. On corner impacts the bumper beam turns with respect to the pivot point remote from the impacted corner to simultaneously stroke both energy managing units.

3 Claims, 3 Drawing Figures

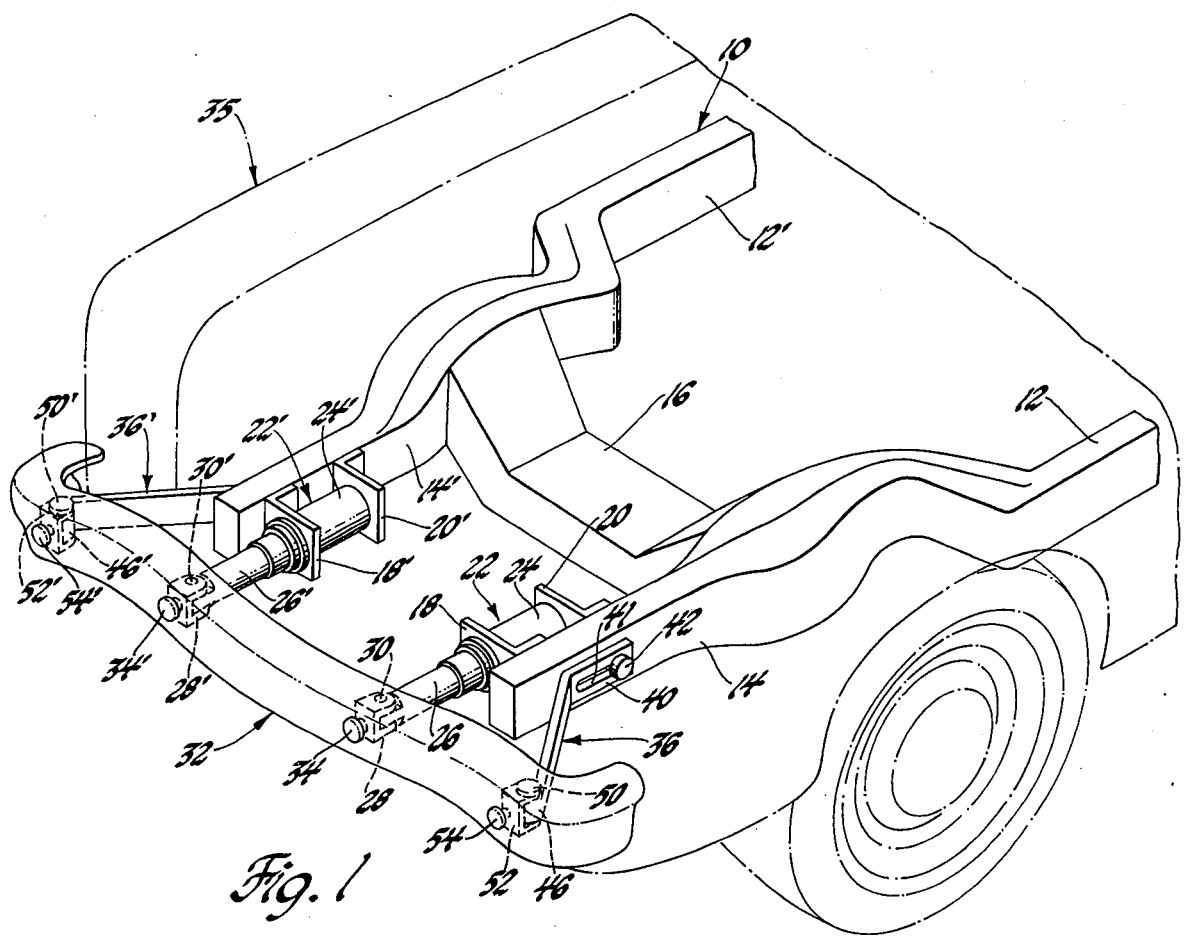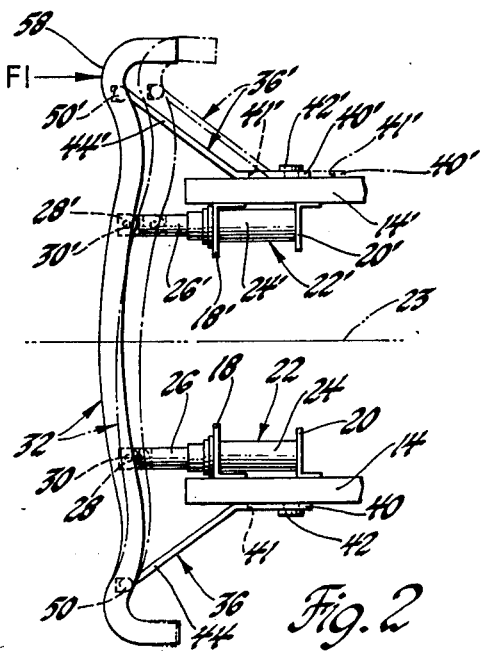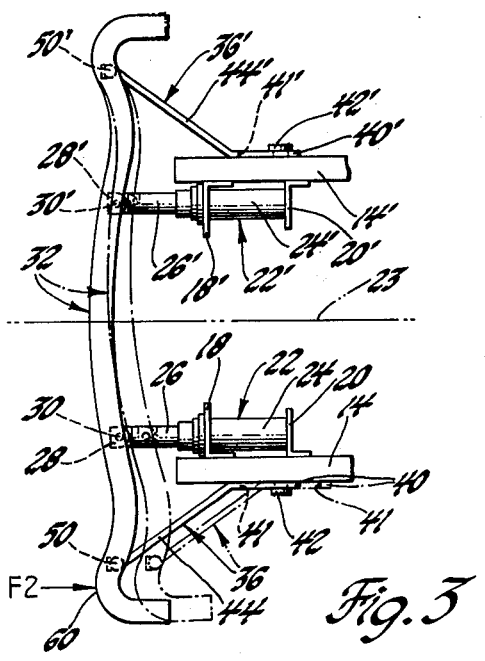

ENERGY MANAGING BUMPER SYSTEM FOR VEHICLES

This invention relates to energy management and more particularly to a new and improved energy managing bumper system for vehicles in which a bumper beam pivots and strokes a pair of energy absorbing units straddling the vehicle center line in response to corner impacts.

Prior to the present invention rigid bumper beams or bumper assemblies for vehicles have been operatively connected to the vehicle frame by a pair of telescopic energy absorbing units to provide for effective dissipation of impact energy when the bumper beam is impacted at low speeds. While the prior bumper systems are satisfactory, they often do not provide effective stroking of both of the energy absorbing units when the bumper beam is impacted at either one of its corners. In the present invention a new and improved energy management bumper system is provided for vehicles which incorporates construction for the effective actuation of both energy absorbing units on impact of either corner of the bumper to thereby provide for improved energy management. In this invention, a pair of conventional type energy absorbing units are employed to couple the bumper beam to the vehicle frame members. Disposed outboard of each of the energy absorber units are special links to couple the bumper beam to the frame and to provide means to permit the bumper beam to turn on a pivot remote from an impacted corner of the bumper beam. With the bumper beam turning in response to a corner impact both energy absorbing units are caused to stroke. With the effective utilization of both energy absorbing units on such corners impacts, impact energy is more effectively dissipated as compared to many prior art systems.

In the preferred embodiment of this invention the side rails of the vehicle frame support a pair of laterally spaced, telescopic energy absorbing units which project outwardly from the vehicle. The ends of these units are pivotally connected to a rigid bumper beam extending laterally across one end of the vehicle. Disposed outboard of the energy absorbing units and also operatively connecting the bumper beam to the side rails of the vehicle frame are a pair of special bracket members adjustably secured to the side rails by pin and slot connections. Pivot means connect the ends of the bracket members to the bumper assembly at points outboard of the adjacent energy absorber unit. On a corner impact on of the bracket members provides a fixed pivot for one end of the bumper beam while the other bracket member yields to allow the turning movement of the bumper. Thus the bumper assembly pivots about a vertical axis remote from the impacted corner of the bumper beam. With the bumper beam pivoting about a remote pivot, both of the energy absorber units will be simultaneously stroked during corner impact so that impact energy will be effectively dissipated.

It is a feature, object and advantage of this invention to provide a new and improved energy absorbing system for vehicles incorporating a pair of energy absorbing units operatively connecting a bumper beam to a vehicle which are simultaneously stroked in response to linear or pivotal displacement of the bumper beam when impacted.

It is a feature, object and advantage of this invention to provide a pair of energy absorbing units for coupling a bumper beam to a vehicle and in which the energy absorber units are forced to simultaneously stroke and absorb energy on corner impact to provide for a reduced beam strength requirement.

Another feature, object and advantage of this invention is to provide a new and improved energy management bumper system for vehicles with special bumper beam support brackets disposed outboard of a pair of energy absorber units coupled to the bumper beam which provides for a reduction in bumper beam motion during corner impact.

A further feature, object and advantage of this invention is to provide a new and improved energy managing bumper system for vehicles which incorporate a new and improved support for a bumper assembly which permits the bumper assembly to pivot with respect to a fixed point outboard of the energy absorbing units connecting the bumper to the vehicle so that both of the energy absorber units will stroke on corner impact.

These and other features, objects and advantages of this invention will be more apparent from the following detailed description and drawing in which:

FIG. 1 is a perspective view of a vehicle chassis frame and the energy managing bumper system according to this invention.

FIGS. 2 and 3 are top plan views of the energy managing bumper system of FIG. 1 illustrating some modes of operation of the system.

Turning now in particular to FIG. 1 of the drawing, there is shown a vehicle chassis frame 10 comprising left and right side rails 12, 12' laterally spaced from each other having forwardly extending horn portions 14, 14' interconnected by a front cross member 16. Bolted or otherwise secured to each horn portion are front and rear L-shaped brackets 18, 18' and 20, 20' that connect identical left and right side energy absorber units 22, 22' to the chassis frame 10. As shown in FIGS. 2 & 3 these units straddle the center line 23 of the vehicle and preferably are telescoping energy absorbers with a gas spring or other suitable motor means to urge them to their normally extended position. One suitable energy absorber construction which may be employed in this invention is disclosed in U.S. Pat. No. 3,794,310 for Hydropneumatic Energy Absorbing Unit issued Feb. 26, 1974 to Albert B. Mewhinney.

The energy absorber units 22, 22' extend through circular openings in their associated outermost brackets 18, 18' and have outer cylinders 24, 24' secured to the corresponding front and rear brackets. Each energy absorber unit further comprises an inner cylinder 26 or 26' that is mounted for limited telescoping movement within its associated outer cylinder and which projects axially therefrom. Energy absorption or dissipation occurs on the inward telescoping movement of the inner cylinder into the outer cylinder as described in the above referenced U.S. Pat. No. 3,794,310. The forward ends of the cylinders 26, 26' are respectively pivotally secured to associated bracket assemblies 28, 28' by vertically disposed pivot pins 30, 30'. Bracket assemblies 28, 28' are respectively secured to a rigid bumper assembly 32 by bolt means 34, 34'. As shown in FIG. 1 this rigid bumper assembly or beam extends laterally across the front or rear of the vehicle body 35. Disposed outboard of the energy absorber units are a pair or restrainer links 36, 36' that control the turning of the bumper assembly on corner impacts as will be described below.

In the preferred embodiment the links 36, 36' have flat base portions 40, 40' respectively with elongated slots 41, 41' therein that receive corresponding bolts 42, 42' extending therethrough. These bolts are threaded or otherwise fastened to the horn portions of the frame and are slidable in their associated slots. As shown the bolts 42, 42' are normally disposed at the inner end of their associated slots. Links 36, 36' have arms 44, 44' respectively flaring outwardly with respect to their base portions and terminate in vertical sockets 46, 46'. These sockets respectively receive pins 50, 50' of corresponding brackets 52, 52' secured to the bumper assembly 32 outboard of the bracket by bolt means 54, 54'.

FIGS. 2 and 3 illustrate some of the operations of the energy management system of this invention and show how both energy absorber units are simultaneously stroked on impact to either corner of the bumper assembly. On such occurrence, one of the links restrains movement of the bumper assembly by providing a fixed pivot point for one side thereof while the opposite link readily yields to permit such pivotal movement. Assuming for example that the upper or right corner 58 of the bumper assembly 32 is impacted by a force F1 sufficient to displace the bumper assembly relative to the chassis frame 10, the pivot pin 50 will serve as a fulcrum so that the bumper assembly swings clockwise from the full line position toward the phantom line position illustrated in FIG. 2. As the bumper swings clockwise on pivot 50, base portion 40' of link 36' slides along the side rail 12' with the slot 41' providing a track for fixed pin 42'. The swinging movement of the bumper assembly strokes both energy absorber units with the stroke of the energy absorber unit 22 being greater since it is disposed at a greater distance from the pivot point provided by pin 50 than that of energy absorber unit 22. Under such conditions, however, both units will be stroked to provide for optimized dissipation of impact energy. Accordingly, the overall movement of the bumper assembly will be reduced as compared to many prior art systems using similar devices in absorbing the same impact energy. It will be appreciated that this invention provides for optimized use of the energy dissipating capability of the units as compared to many prior art systems. Since the amount of bumper displacement will be reduced, styling freedom is improved as compared to many other systems.

FIG. 3 discloses the operation of the device on a left corner impact. In this illustration the left corner 60 of the bumper assembly 32 is impacted by a force F2 in a manner similar to that described in connection with FIG. 2. This impact force causes the bumper assembly to swing counterclockwise on pivot pin 50' to stroke both energy absorber units. This movement is accompanied by the sliding movement of the base portion 40 of bracket 36 as permitted by the pin 42 and slot 41. The energy absorber unit 22 being closer to the corner impact is stroked a greater amount than the more remote energy absorber unit 22'. As in FIG. 2 it will be appreciated that left corner impact forces are absorbed by operation of both units instead of a single unit as compared to many prior art arrangements. On severe corner impacts the bracket 36 and 36' may be bent or distorted, however with their simplified construction they may be readily repaired of replaced. It will be appreciated that cables or spring devices may well be substituted for the restrainer link described, the important feature being the provision of a fixed pivot point outboard of the energy absorber unit remote from the impact to permit the bumper to turn in an arc to actuate both energy absorber units.

With center impacts both units are effective and stroke equal amounts for energy dissipation as the bumper assembly is moved linearly toward the energy absorber units.

While a preferred embodiment of this invention has been shown and described to illustrate the invention other embodiments will be apparent to those skilled in the art. Accordingly, the scope of this invention is set forth in the following claims.

I claim:

1. An energy managing bumper system for a vehicle having a frame with a pair of laterally spaced longitudinally extending side rails, said system comprising an elongated normally rigid bumper beam extending laterally across one end of said side rails of said vehicle, a pair of energy absorbing units laterally spaced from each other and yieldable in response to the application of a predetermined impact thereto, said energy absorbing units straddling the center line of the vehicle and operably and directly connecting said bumper beam to said side rails of said vehicle for movement between an extended and a retracted position with respect to said vehicle, a pair of retainer means disposed outboard of said energy absorbing unit and extending forwardly from said side rails, fastener means attaching one end of each of said retainer means directly to a corresponding side rail to prevent the outward movement therefrom, connector means operatively connecting said bumper beam to the forward ends of said retainer means, each of said connector means providing a fixed pivot point for said bumper beam disposed laterally outboard of said energy absorbing units so that each said energy absorbing unit is immediately activated in response to an impact to either end of said bumper beam which causes said bumper beam to turn with respect to either one of said pivot points and move toward the vehicle.

2. An energy managing bumper system for a vehicle having a frame, an elongated normally rigid bumper beam extending laterally across one end of the vehicle frame, a pair of self-restoring energy absorbing units laterally spaced from each other, each of said energy absorbing units having an inner end directly attached to said vehicle frame and each extending outwardly therefrom, said units straddling the center line of the vehicle and operatively connecting said bumper beam to said vehicle for movement between an extended and a retracted position with respect to said vehicle, a pair of laterally spaced retainer links outboard of said units extending forwardly from said vehicle frame, fastener means securing the inner end of each of said links directly to said vehicle frame to establish the outer limit of movement of each of said links, connector means operatively connecting said bumper beam to the outer ends of said retainer links, said connector means providing a pair of fixed pivot points for said bumper beam laterally outboard of the ends of said energy absorbing units respectively so that each said energy absorbing unit is immediately stroked on corner impact of said bumper beam which causes said bumper beam to turn with respect to one of said pivot points remote from said impact, and said fastener means comprising pin and slot lost motion connection means directly coupling each of said retainer links to said vehicle frame permitting the free retractile movement of said bumper beam toward said vehicle as said bumper beam turns with respect to either one of said pivot points.

3. An energy managing bumper system for a vehicle having a pair of longitudinally extending side rails forming a portion of a vehicle frame, an elongated normally rigid bumper beam extending laterally across one end of the side rails of the vehicle and across the center line thereof, first and second telescoping energy absorbing units operatively connected to the respective side rails and to the bumper beam, said energy absorbing units being laterally spaced from each other and disposed on opposite sides of the center line of the vehicle for yieldably connecting said bumper beam to said side rails and for dissipating impact energy causing movement of said bumper beam toward said vehicle, a pair of retainer links extending forwardly from said side rails for movably supporting said bumper beam, said links being laterally spaced from each other outboard of said energy absorbing units, means securing one end of each of said links directly to an associated one of said side rails to prevent the outward movement of said bumper beam when impacted, said links extending outwardly from said side rails to operatively connect opposite end portions of said bumper beam to said vehicle, pivot means operatively connecting said bumper beam to the free end portions of said retainer links to provide a pair of fixed turning points for said bumper beam outboard of said energy absorbing units so that each of said energy absorbing units will be immediately and simultaneously telescoped in response to an impact on said bumper beam by a force offset from said center line sufficient to turn said bumper beam with respect to either one of said fixed turning points.

* * * * *

UNITED STATES PATENT OFFICE
CERTIFICATE OF CORRECTION

Patent No. 4,061,386  Dated December 6, 1977

Inventor(s) Ronald Chupick

It is certified that error appears in the above-identified patent and that said Letters Patent are hereby corrected as shown below:

Title page, column, add the following references cited:
-- 1,773,928   8/1930   Ambush.................293/85
   1,645,561  10/1927   Weiland................293/89
   2,038,964   4/1936   Smith..................293/96
   1,503,049   7/1924   Jezek..................293/5
   2,094,739  10/1937   Geiger.................293/85
   3,702,202  11/1972   Rumsey.................293/89
   3,655,231   4/1972   Killea, Jr.............293/96
   3,797,873   3/1974   Cook...................293/96 -- .

Column 2, line 63, "or" should read -- of -- .

Signed and Sealed this

Sixteenth Day of May 1978

[SEAL]

Attest:

RUTH C. MASON           LUTRELLE F. PARKER
Attesting Officer     Acting Commissioner of Patents and Trademarks